US007684373B2

(12) United States Patent
Ekvetchavit et al.

(10) Patent No.: US 7,684,373 B2
(45) Date of Patent: *Mar. 23, 2010

(54) COVERAGE DETERMINATION AND SWITCHING BETWEEN OVERLAY COMMUNICATION SYSTEMS

(75) Inventors: Thunyachate Ekvetchavit, San Diego, CA (US); Ravi Govindarajula, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1128 days.

This patent is subject to a terminal disclaimer.

(21) Appl. No.: 10/933,726

(22) Filed: Sep. 2, 2004

(65) Prior Publication Data

US 2006/0046661 A1 Mar. 2, 2006

(51) Int. Cl.
*H04B 7/216* (2006.01)
(52) U.S. Cl. .................. 370/335; 370/342; 370/331; 455/434
(58) Field of Classification Search .......... 370/335–338, 370/329–333, 252, 341–345, 348; 455/436–444
See application file for complete search history.

(56) References Cited

U.S. PATENT DOCUMENTS

| 6,151,502 | A  | * | 11/2000 | Padovani et al. | ............. | 455/442 |
| 6,192,040 | B1 | * | 2/2001  | Jalloul et al.  | ................ | 370/335 |
| 6,252,861 | B1 | * | 6/2001  | Bernstein et al. | ............ | 370/331 |
| 7,058,035 | B2 | * | 6/2006  | English         | ...................... | 370/332 |
| 7,313,116 | B2 | * | 12/2007 | Lee et al.      | .................... | 370/335 |
| 2002/0049058 | A1 | * | 4/2002 | Tee            | ............................ | 455/437 |
| 2003/0148765 | A1 | * | 8/2003 | Ma et al.      | .................... | 455/438 |
| 2004/0165563 | A1 |   | 8/2004 | Hsu et al.     |                     |         |

FOREIGN PATENT DOCUMENTS

| EP | 1257141 | 10/2001 |
| EP | 1424862 | 11/2003 |

OTHER PUBLICATIONS

Zhang Q et al; "Efficient Mobility Management for Vertical Handoff Between WWAN and WLAN"; IEEE Communications Magazine, IEEE Service Center, NY, NY, US.; vol. 41, No. 11; Nov. 2003; pp. 102-108; XP001185186.

* cited by examiner

*Primary Examiner*—Thai D Hoang
(74) *Attorney, Agent, or Firm*—Howard H. Seo; Kristine U Ekwueme (57) ABSTRACT

For coverage determination and system switching, a terminal obtains pilot strength estimates for base stations in first and second wireless communication systems (e.g., packet data system and voice/data system) and received signal quality estimates for at least one serving base station in the first system. The terminal derives various metrics based on the received signal quality estimates and pilot strength estimates. The terminal may perform handoff to the second system if weak coverage is detected for the first system, a received signal quality metric (Q) for the first system is below a $Q_{th\_dn}$ threshold, and a pilot strength metric (V) for the second system exceeds a $V_{th\_dn}$ threshold. The terminal may perform handoff to the first system if good coverage is detected for this system, metric Q exceeds a $Q_{th\_up}$ threshold, or a maximum pilot strength metric (M) for the first system exceeds a $M_{th\_up}$ threshold.

23 Claims, 8 Drawing Sheets

COVERAGE DETERMINATION AND SWITCHING BETWEEN OVERLAY COMMUNICATION SYSTEMS

BACKGROUND

I. Field

The present invention relates generally to communication, and more specifically to techniques for determining coverage and switching between overlay communication systems.

II. Background

Wireless communication systems are widely deployed to provide various communication services such as voice, packet data, and so on. These systems may be multiple-access systems capable of supporting communication with multiple users by sharing the available system resources. Examples of such multiple-access systems include Code Division Multiple Access (CDMA) systems, Time Division Multiple Access (TDMA) systems, and Frequency Division Multiple Access (FDMA) systems. A CDMA system may implement a radio access technology (RAT) such as cdma2000, Wideband-CDMA (W-CDMA), and so on. cdma2000 covers IS-2000, IS-856, and IS-95 standards. A TDMA system may implement Global System for Mobile Communications (GSM) for over-the-air communication and General Packet Radio Service (GPRS) for packet data transmission. These various RATs and standards are known in the art.

Some wireless communication systems (e.g., cdma2000, W-CDMA, and GSM/GPRS systems) are capable of providing voice and packet data services. Each type of service has different characteristics. For example, voice service typically requires a common grade of service (GoS) for all users as well as relatively stringent delays. In contrast, packet data service may be able to tolerate different GoS for different users and may further be able to tolerate variable delays. To support both voice and packet data services, a wireless communication system may first allocate system resources to voice users and then allocate any remaining system resources to packet data users who are able to tolerate longer delays.

Some wireless communication systems are optimized for packet data transmission, which is typically characterized by long periods of silence punctuated by large bursts of traffic. One such system is an IS-856 system, which allocates most or all of the system resources to one user at any given time, thereby greatly increasing the peak data rate for the user being served.

A service provider/network operator may deploy multiple wireless communication systems to provide enhanced services for its subscribers. For example, a service provider may deploy one system capable of providing both voice and packet data services for a large geographic area and may deploy another system capable of providing packet data service for areas where packet data usage is expected to be high. The coverage areas of the two systems typically overlap, and these systems would be considered as "overlay" systems. A multi-mode/hybrid terminal may be able to receive service from one of the two systems at any given moment depending on the location of the terminal and the desired service. Some of the challenges in such overlay systems include (1) determining the coverage boundaries of the individual systems and (2) deciding when the terminal should switch between the two systems.

There is therefore a need in the art for techniques to determine coverage and to switch between overlay communication systems.

SUMMARY

Techniques to determine whether a terminal has good coverage for a first wireless communication system (e.g., a packet data system) and whether to switch to/from a second wireless communication system (e.g., a voice/data system) are described herein. The terminal makes measurements for base stations in the first system and obtains pilot strength estimates for these base stations as well as received signal quality estimates for at least one base station selected for data transmission to the terminal. The terminal also makes measurements for one or more base stations in the second system and obtains pilot strength estimates for these base stations. The terminal derives various metrics based on the received signal quality estimates and the pilot strength estimates for the base stations in the first system and the pilot strength estimates for the base stations in the second system. The terminal uses these metrics to determine whether the coverage of the first system is good and whether to switch from the first system to the second system, and vice versa.

As an example, the terminal may perform handoff from the first system to the second system if all of the following criteria are met: (1) weak coverage is detected for the first system for more than a predetermined amount of time, (2) a received signal quality metric (Q) for the first system is below a $Q_{th\_dn}$ threshold, and (3) a pilot strength metric (V) for the second system is greater than a $V_{th\_dn}$ threshold. A composite pilot strength metric (C) may be used to determine whether the coverage of the packet data system is weak. The terminal may perform handoff from the second system to the first system if any one of the following criteria is met: (1) good coverage is detected for the first system, (2) the received signal quality metric for the first system is deemed to be reliable and is above a $Q_{th\_up}$ threshold, or (3) a maximum pilot strength metric (M) for the first system is greater than a $M_{th\_up}$ threshold. The terminal may also switch between systems based on other parameters, metrics, criteria, and so on. The metric computation, coverage determination, and switching between systems are described in detail below. Various aspects and embodiments of the invention are also described in further detail below.

BRIEF DESCRIPTION OF THE DRAWINGS

The features and nature of the present invention will become more apparent from the detailed description set forth below when taken in conjunction with the drawings in which like reference characters identify correspondingly throughout and wherein.

DETAILED DESCRIPTION

The word "exemplary" is used herein to mean "serving as an example, instance, or illustration." Any embodiment or design described herein as "exemplary" is not necessarily to be construed as preferred or advantageous over other embodiments or designs.

The coverage determination and system switching techniques described herein may be used for various wireless communication systems such as IS-2000, IS-856, IS-95, W-CDMA, and GSM/GPRS systems. These techniques may be used for multiple (e.g., two) communication systems that (1) have coverage areas that overlap at least partially and (2) provide at least one common service (e.g., packet data). For example, one of the systems may be a voice/data system that can provide voice and packet data services, and another one of the systems may be a packet data system that can provide packet data service. For clarity, certain details of the techniques are described for an IS-2000 system (commonly called a "1x" system) that can provide voice and packet data services and an IS-856 system (commonly called a "1xEV-DO" or "HDR" system) that can provide packet data service.

Figure 1:
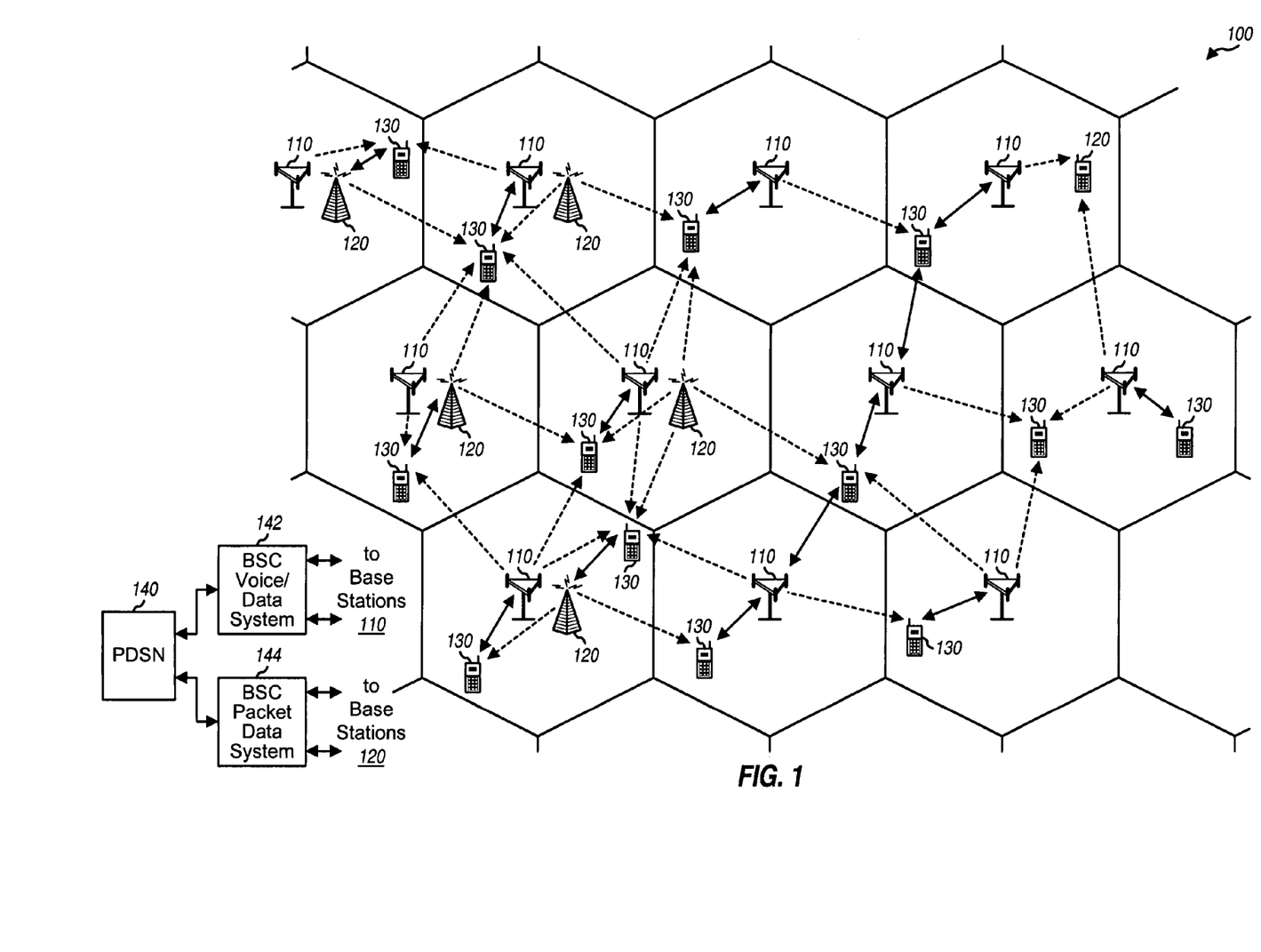
FIG. 1 shows a packet data system overlaying a voice/data system.

FIG. 1 shows an exemplary deployment 100 whereby a packet data system (e.g., a 1xEV-DO system) overlays a voice/data system (e.g., a 1x system). The voice/data system includes a number of base stations 110 that can provide voice and packet data services for terminals 130 located within the coverage area of these base stations. Similarly, the packet data system includes a number of base stations 120 that can provide packet data service for terminals 130 located within the coverage areas of these base stations. Base stations 110 and 120 may be located at different sites or co-located at the same sites. Base stations 110 couple to a base station controller (BSC) 142 that provides coordination and control for these base stations. Similarly, base stations 120 couple to a BSC 144 that provides coordination and control for these base stations. BSCs 142 and 144 further couple to packet data serving node (PDSN) 140 that supports packet data service for the voice/data system and the packet data system.

In general, a base station (1x terminology) is a fixed station used for communicating with the terminals and may also be called an access point (1xEV-DO terminology), a Node B (W-CDMA terminology), a base transceiver station (BTS), or some other terminology. A terminal may be fixed or mobile and may also be called a mobile station (1x terminology), an access terminal (1xEV-DO terminology), a user equipment (W-CDMA terminology), a wireless device, or some other terminology. For simplicity, in the description below, the term "base station" is used for a fixed station and the term "terminal" is used for a device that communicates with the fixed station.

In FIG. 1, a solid line with arrows on both ends indicates active communication between a terminal and a base station. A dashed line with an arrow on one end indicates reception of a pilot by a terminal from a base station. A pilot is a reference signal that is generated based on known data and processed in a known manner. A terminal may communicate with one or multiple base stations on the forward link and/or reverse link at any given moment. The forward link (or downlink) refers to the communication link from the base stations to the terminals, and the reverse link (or uplink) refers to the communication link from the terminals to the base stations. A terminal may communicate concurrently with multiple base stations if soft handoff is supported. For example, IS-2000 and W-CDMA support soft handoff for the forward and reverse links, and IS-856 supports soft handoff for the reverse link but not the forward link.

Figure 2:
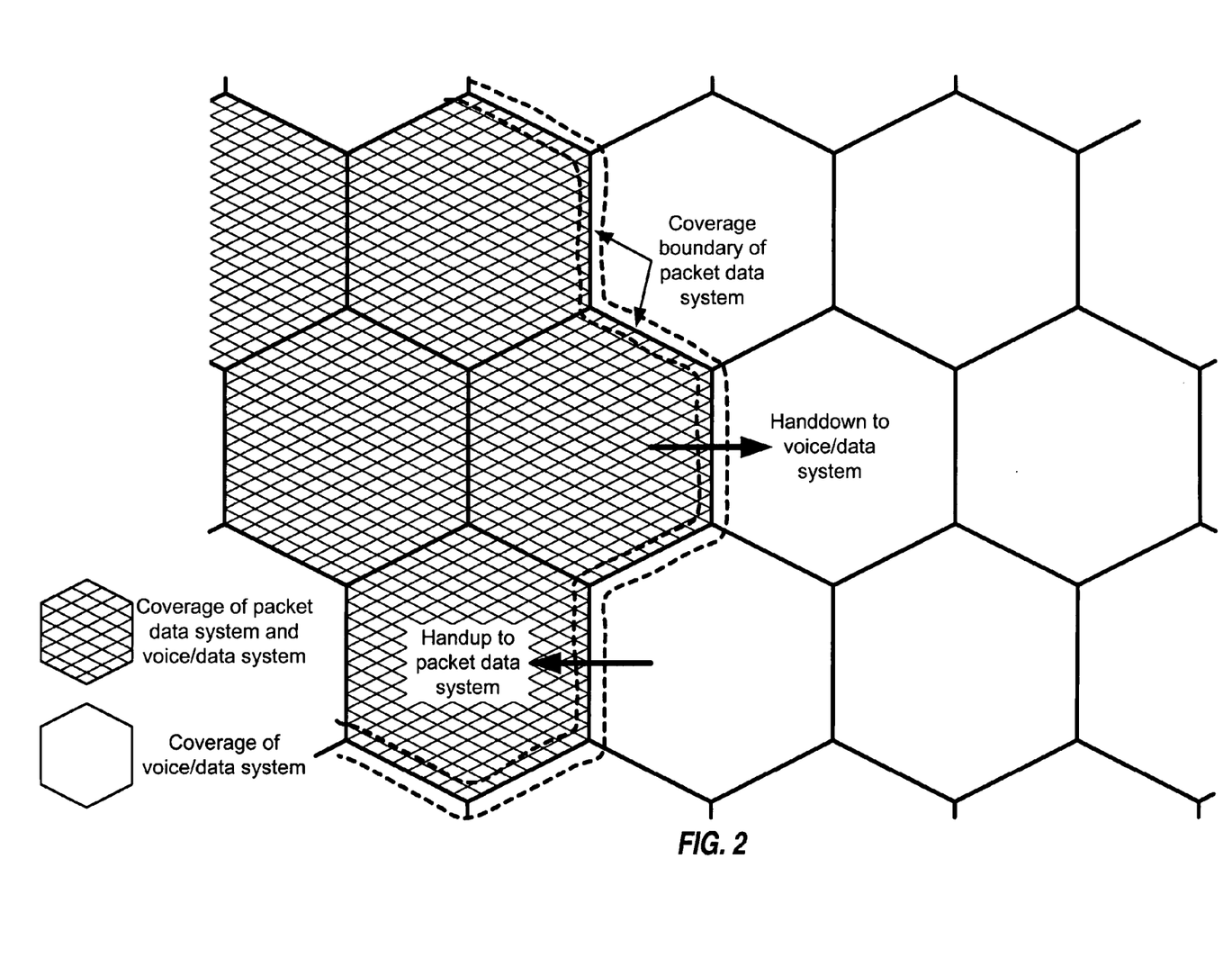
FIG. 2 shows coverage areas of the packet data system and voice/data system.

FIG. 2 shows the coverage areas of the packet data system and the voice/data system. For simplicity, the coverage area of each base station is represented by an ideal hexagon. In actuality, the coverage area of a base station is determined by various factors such as terrain, antenna pattern, obstruction, and so on, and may have any shape. The coverage area of the packet data system may or may not be contiguous and may overlap the coverage area of the voice/data system by any amount. Furthermore, the coverage boundary of the packet data system may not be clearly demarcated.

A multi-mode/hybrid terminal may be able to communicate with both the packet data system and the voice/data system. The terminal may have an upper layer data session (e.g., a Point-to-Point Protocol (PPP) data session) opened for any amount of time. The data session may be active or dormant at any given moment depending on whether there is any data to exchange. If the data session is active, then the terminal opens a connection with the packet data system to exchange data. During the data session, the terminal may periodically measure signals from the voice/data system. If the terminal determines that the packet data system becomes "unusable" for the data session and the voice/data system is available, then the terminal initiates a handoff from the packet data system to the voice/data system. The terminal can maintain the data session with the voice/data system and exchange data with this system as needed. While on the voice/data system, the terminal monitors the signals from the packet data system. If the terminal determines that the packet data system is usable for the data session, then the terminal initiates a handoff from the voice/data system to the packet data system. In the following description, a "handup" is a handoff of a data session from the voice/data system to the packet data system, and a "handdown" is a handoff of the data session from the packet data system to the voice/data system.

The coverage area of the packet data system may be overlaid in patches on top of the coverage area of the voice/data system, as shown in FIG. 2. The coverage area of each system is the area in which the terminal can receive communication service from the system. The coverage area of each system is related to the usability of the system for communication with the terminal. The terms "coverage", "usability", and "usable" may thus be used interchangeably in the following description. Simply acquiring the pilots transmitted by base stations in the packet data system may not necessarily mean that the channel conditions are favorable to originate a data call or to maintain the data call on the packet data system. The techniques described herein can more accurately determine the coverage of the packet data system.

Accurate determination of the coverage of the packet data system is desirable for various reasons. For example, if the terminal is mobile and moves out of the coverage of the packet data system, then it is desirable for the terminal to switch to the voice/data system upon reaching the coverage edge of the packet data system so that the terminal can maintain the data session. A timely switch to the voice/data system reduces delay in handing off to this system and further avoids disruption of service. If the terminal thereafter re-enters the coverage of the packet data system, then it is desirable to hand off the terminal and transfer the data session from the voice/data system to the more efficient packet data system. Accurate coverage determination can also avoid or minimize frequent handups and handdowns near the coverage boundary of the packet data system, so that the data session is not ping-ponged (i.e., continually handed off) between the two systems.

Figure 3:
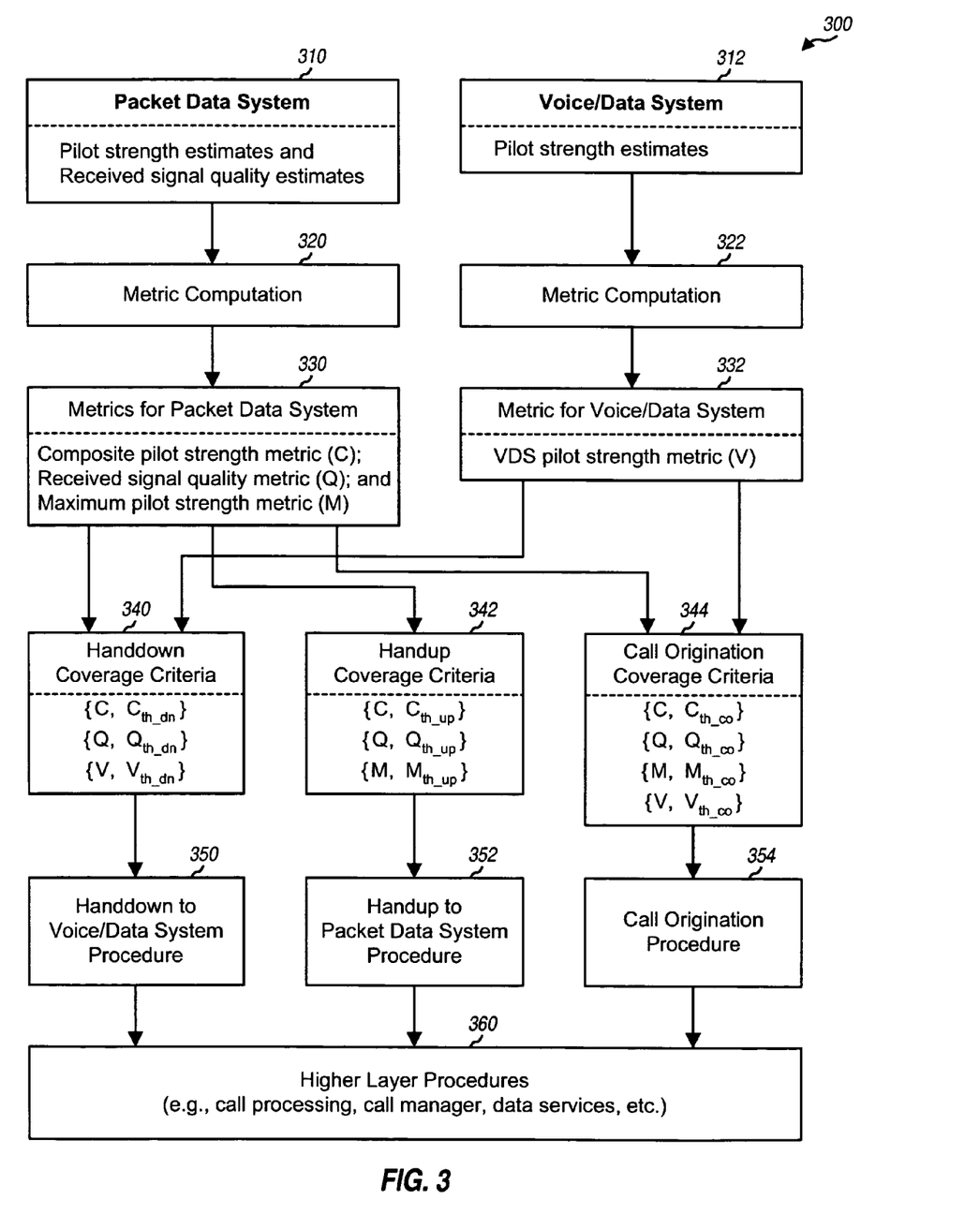
FIG. 3 shows an overview of a mechanism for determining coverage of the packet data system for handup, handdown, and call origination.

FIG. 3 shows an overview of a mechanism 300 for determining the coverage of the packet data system for handup, handdown, and call origination. For the packet data system, the terminal obtains (1) pilot strength estimates for base stations in the packet data system and (2) received signal quality estimates for one or more base stations selected to transmit data to the terminal (block 310). The terminal computes various metrics based on the received signal quality estimates and pilot strength estimates obtained for the packet data system (block 320). These metrics may include a composite pilot strength metric (C), a received signal quality metric (Q), and a maximum pilot strength metric (M) (block 330). These parameters and metrics are described in detail below.

For the voice/data system, the terminal obtains pilot strength estimates for one or more base stations in the voice/data system (block 312). The terminal computes one or more metrics based on the pilot strength estimates obtained for the voice/data system (block 322). These metric(s) may include a voice/data system (VDS) pilot strength metric (V) (block 332).

Various criteria may be used to determine the coverage of the packet data system and hence the usability of the packet data system for the data session. Each criterion represents a condition for determining whether the terminal is in the coverage of the packet data system. Each criterion may be evaluated based on a metric and an associated threshold (e.g., whether metric Q is less than a $Q_{th}$ threshold). A criterion may also be evaluated based on multiple metrics and/or multiple thresholds. Different sets of criteria may be used to determine the coverage of the packet data system for different scenarios such as (1) handdown to the voice/data system (block 340), (2) handup to the packet data system (block 342), and (3) call origination with the best available system (block 344).

A handdown procedure 350 determines whether the data session should be handed off to the voice/data system based on the criteria in block 340. A handup procedure 352 determines whether the data session should be handed off to the packet data system based on the criteria in block 342. A call origination procedure 354 determines whether a call should be originated with the packet data system or the voice/data system based on the criteria in block 344. These procedures are described in detail below. Higher layer procedures (e.g., for call manager, call processing, data services, and so on) receive indications from procedures 350, 352, and 354 and may initiate handdown, handup, or call origination with the appropriate system.

The terminal may maintain multiple sets of base stations, where each base station may also be called a "sector" or a "cell". For IS-856, the terminal maintains the following sets:

Active Set—includes base stations from which the terminal may request data transmission on the forward link;
Candidate Set—includes base stations whose pilots are received by the terminal with high pilot strength but are not included in the Active Set;
Neighbor Set—includes base stations advertised by the system to be neighbors of the base stations in the Active Set; and
Remaining Set—includes all remaining base stations that are not included in any of the other three sets.

Measurements for base stations in the various sets are used to determine the coverage of the packet data system, as described below.

The coverage of the packet data system may be determined based on various parameters such as pilot strength and received signal quality. Pilot strength is indicative of the received power of a pilot and may be quantified by an energy-per-chip-to-total-noise-and-interference ratio (Ec/Io). To estimate the pilot strength of a given base station, the terminal first determines the pilot power (Ec) received at the terminal for the base station and the total noise and interference (Io) received at the terminal. If multiple signal instances (i.e., multipaths or peaks) are received by the terminal for the base station, then the terminal sums the received pilot powers for all multipaths to obtain the total pilot power for the base station. The terminal then derives the pilot strength estimate as the ratio of the total pilot power to the total noise and interference, or Ec/Io.

Received signal quality is indicative of the transmission capability of a communication link and may be quantified by a signal-to-interference-and-noise ratio (SINR), a signal-to-noise ratio (SNR), an energy-per-chip-to-noise-and-interference ratio (Ec/Nt), and so on. To estimate the received signal quality for a given base station, the terminal first determines the received pilot power (Ec) for the base station and the total noise and interference (Io). The terminal next computes the noise and interference power (Nt) by subtracting the received pilot power from the total noise and interference, or Nt=Io−Ec. The terminal then derives the received signal quality estimate as the ratio of the received pilot power to the noise and interference, or Ec/Nt. The noise and interference (Nt) term for received signal quality does not include the desired signal (Ec) whereas the total noise and interference (Io) term for pilot strength includes the signal power. Pilot strength and received signal quality at the terminal for a given base station may both be determined based on the pilot transmitted by the base station.

Figure 4:
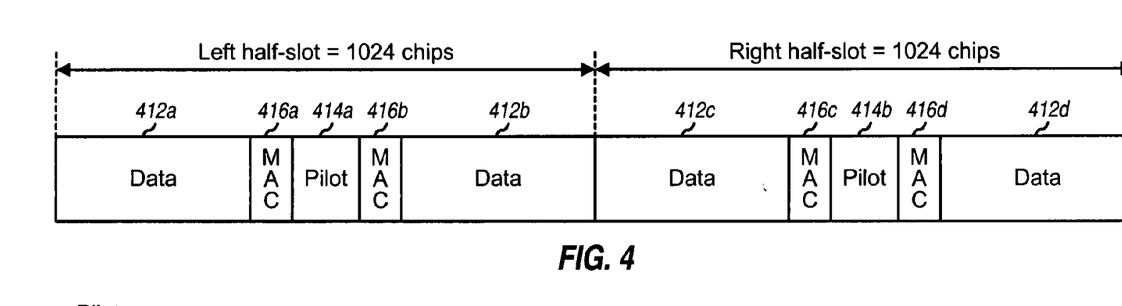
FIG. 4 shows a slot format and a pilot transmission scheme used in IS-856.

FIG. 4 shows a slot format and a pilot transmission scheme used in IS-856. Each slot is divided into two half-slots. Each half-slot includes two data fields 412, a pilot field 414, and two signaling fields 416. Data fields 412 carry user-specific data and possibly overhead data. Pilot fields 414 carry the pilot for the base station. Signaling fields 416 carry Media Access Control (MAC) signaling such as, e.g., reverse power control (RPC) information to direct terminals to adjust their transmit power either up or down. For IS-856, each slot has a duration of 2048 chips, each data field 412 has a duration of 400 chips, each pilot field 414 has a duration of 96 chips, and each signaling field 416 has a duration of 64 chips. A chip is equal to 1/BW, where BW is the system bandwidth, which is typically 1.2288 MHz for IS-856.

The terminal can obtain a good received signal quality estimate based on the pilot structure used in IS-856. This is because each base station in the IS-856 system transmits its pilot at full power. Furthermore, the base stations in the IS-856 system are synchronous and transmit their pilots at approximately the same time. The pilots then observe little or no interference from data transmissions in neighboring base stations.

The terminal uses the received signal quality estimates and pilot strength estimates for base stations in the various sets to compute metrics. Table 1 lists exemplary metrics that may be computed by the terminal and used to determine the coverage of the packet data system and to switch between systems.

TABLE 1

| Metrics | Description | System |
| --- | --- | --- |
| Composite pilot strength metric (C) | Indicative of the coverage and quality of the packet data system. | Packet data system |
| Received signal quality metric (Q) | Indicative of received signal quality for the serving base station in the packet data system. | Packet data system |
| Maximum pilot strength metric (M) | Indicative of the strongest detected pilot in the packet data system. | Packet data system |
| VDS pilot strength metric (V) | Indicative of the forward link signal strength for the voice/data system. | Voice/data system |

The composite pilot strength metric (C) is indicative of the overall forward link signal strength received by the terminal from the packet data system. This metric represents the coverage and quality of the packet data system and may thus be called a coverage metric. To derive this metric, the terminal periodically measures the pilot strength of the base stations in some or all of the four sets listed above. For example, the terminal may measure the pilot strength of (1) all base stations in the Active Set and the Candidate Set and (2) some base stations in the Neighbor Set and the Remaining Set. The terminal makes pilot measurements in each measurement period, which may also be called search interval. The terminal may average pilot strength measurements obtained for the current and prior measurement periods for each base station to derive a pilot strength estimate for that base station. The terminal may compare the pilot strength estimate for each base station against a pilot strength threshold ($P_{th}$) and discard weak pilot strength estimates that fall below this threshold. The terminal may then compute the composite pilot strength metric (C) as follows:

$$C = \text{Sum of strong pilot strength estimates for the Active Set} + \text{Sum of strong pilot strength estimates for the Candidate Set} + \text{Max of strong pilot strength estimates for the Neighbor Set.} \quad \text{Eq (1)}$$

The pilot strength estimates in equation (1) are in linear units, i.e., not in decibels (dB).

For equation (1), a strong pilot strength estimate is one that is greater than or equal to the pilot strength threshold. The pilot strength threshold is used so that the terminal does not add up weak pilot strength estimates for the composite pilot strength metric. The same threshold value may be used for all four sets or different threshold values may be used for different sets. Furthermore, different threshold values may be used for the handdown, handup, and call origination procedures.

Equation (1) shows a specific embodiment for computing the composite pilot strength metric. This metric may also be computed in other manners and/or with pilot strength estimates for different base stations. For example, metric C may include pilot strength estimates for zero, one, or multiple base stations in the Neighbor Set. As another example, metric C may include the maximum of strong pilot strength estimates for base stations in the Remaining Set. In any case, the composite pilot strength metric is derived by summing strong pilot strength estimates for multiple base stations. This metric is thus less susceptible to false alarms (or unnecessary handups and handdowns) in pilot polluted areas (i.e., areas with many pilots) and in deep fade environments (e.g., elevators, tunnels, and so on).

The received signal quality metric (Q) is indicative of the quality of the communication link via which the terminal may receive data transmission. If only one base station in the packet data system can transmit to the terminal at any given moment (i.e., no soft handoff), then the terminal derives metric Q based on the received signal quality estimate for the base station selected for data transmission. If multiple base stations in the packet data system can transmit to the terminal at the same time (i.e., with soft handoff), then the terminal derives metric Q based on the received signal quality estimates for all base stations selected for data transmission. The received signal quality metric may be derived in various manners. In an embodiment, metric Q is computed as follows:

$$Q = \text{Sum of received signal quality estimates for all serving base stations.} \quad \text{Eq (2)}$$

The received signal quality estimates in equation (2) are in linear units, i.e., not in dB. An embodiment for deriving metric Q for the IS-856 system is described below.

Figure 5:
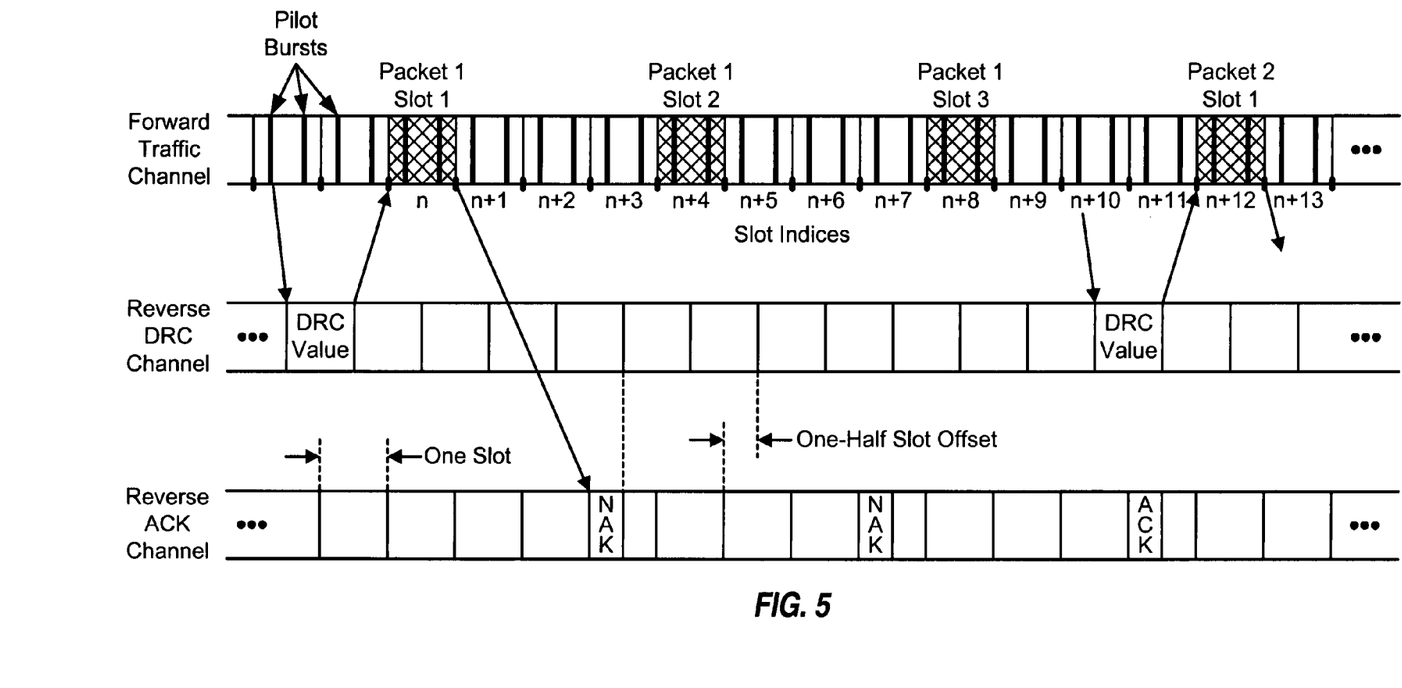
FIG. 5 shows a forward link transmission scheme used in IS-856.

FIG. 5 shows a forward link transmission scheme used in IS-856. Whenever the terminal desires data transmission, the terminal estimates the signal quality of the pilot from each base station in the Active Set, selects the base station with the best received signal quality, determines the highest data rate supported by the selected base station, and sends a Data Rate Control (DRC) value indicative of the selected data rate. The terminal transmits the DRC value to the selected base station. The selected base station (or serving sector) then transmits data packets to the terminal at or near the peak transmit power level. Each data packet is partitioned into multiple blocks, and each block is transmitted in one slot. The terminal attempts to decode a data packet after receiving each block for the packet and sends an acknowledgment (ACK) if the packet is decoded correctly or a negative acknowledgment (NAK) otherwise. The selected base station transmits the blocks for each data packet until an ACK is received for the packet or until the maximum allotted slots for the transmission of that packet are exhausted. The transmission scheme for IS-856 is described in a document 3GPP2 C.S0024, entitled "cdma2000 High Rate Packet Data Air Interface Specification," which is publicly available.

The IS-856 system does not support soft handoff on the forward link, and the terminal selects the base station with the best received signal quality for data transmission. The terminal generates the DRC value based on the best received signal quality estimate. The DRC value may indicate a null data rate (i.e., 0 kbps) or a non-null data rate ranging from 38.4 kbps to 2,457.6 kbps. Progressively higher data rates correspond to progressively higher received signal quality estimates (and generally higher DRC values). Since the terminal generates DRC values for normal operation anyway and since the DRC values are indicative of received signal quality, the DRC values may be conveniently used to derive the received signal quality metric (Q).

In an embodiment, the received signal quality metric (Q) is indicative of the average percentage of time the terminal requests non-null data rates. For this embodiment, the terminal filters the DRC values, e.g., with a single-pole infinite impulse response (IIR) filter, as follows:

$$Y(n) = (1 - \alpha) \cdot Y(n-1) + \alpha \cdot X(n), \quad \text{Eq (3)}$$

where $X(n) = $ '0' if the DRC value for slot $n$ is null, $\qquad = $ '1' if the DRC value for slot $n$ is non-null;

$Y(n)$ is the output of the IIR filter for slot $n$; and $\alpha$ is the gain of the IIR filter.

The filter gain $\alpha$ ranges from 0.0 to 1.0, with a smaller value corresponding to more filtering. For example, a filter time constant of approximately 128 slots may be achieved by setting $\alpha = 1/128$. The filter output $Y(n)$ also ranges from 0.0 to 1.0.

The received signal quality metric (Q) may then be computed as:

$$Q = 100 \cdot Y(n), \quad \text{Eq (4)}$$

where Q ranges from 0% to 100%.

The embodiment described above sets the filter input $X(n)$ to '1' if the DRC value is for a non-null rate and does not make a distinction between various non-null rates that may be indicated by the DRC value. In another embodiment, $X(n)$ may be set to the DRC value, and the received signal quality metric would then be indicative of the average throughput for the communication link. In yet another embodiment, the received signal quality metric may be computed directly based on the received signal quality estimates used to derive the DRC values. For example, the terminal may compare the received signal quality estimate for each slot against a threshold, set the received signal quality estimate to zero if it falls below the threshold, and filter the output of the comparison over multiple slots.

The maximum pilot strength metric (M) is indicative of the forward link signal strength of the strongest pilot received by the terminal from the packet data system. This metric is useful in scenarios where the received signal quality metric is not reliable. The terminal may compute this metric as follows:

$$M = \text{Max of \{pilot strength estimates for the Active Set and pilot strength estimates for the Candidate Set\}}. \quad \text{Eq (5)}$$

The VDS pilot strength metric (V) for the voice/data system is indicative of the forward link signal strength for the voice/data system. This metric is useful to determine whether the voice/data system is suitable for handdown. The terminal may compute this metric as follows:

$$V = \text{Maximum of strong pilot strength estimates for the VDS Active Set}. \quad \text{Eq. (6)}$$

The VDS Active Set includes all base stations in the voice/data system that may transmit data to the terminal (when active) and signaling (when idle). The VDS Active Set may include one or multiple base stations depending on the voice/data system and/or the operating state of the terminal. The terminal may also compute metric V based on (1) the sum of strong pilot strength estimates for base stations in the VDS Active Set or (2) some other function of pilot strength estimates for base stations in the voice/data system.

The terminal may operate in one of multiple possible operating states at any given moment. The terminal may execute different procedures in different operating states and thus compute different metrics in different states.

Figure 6:
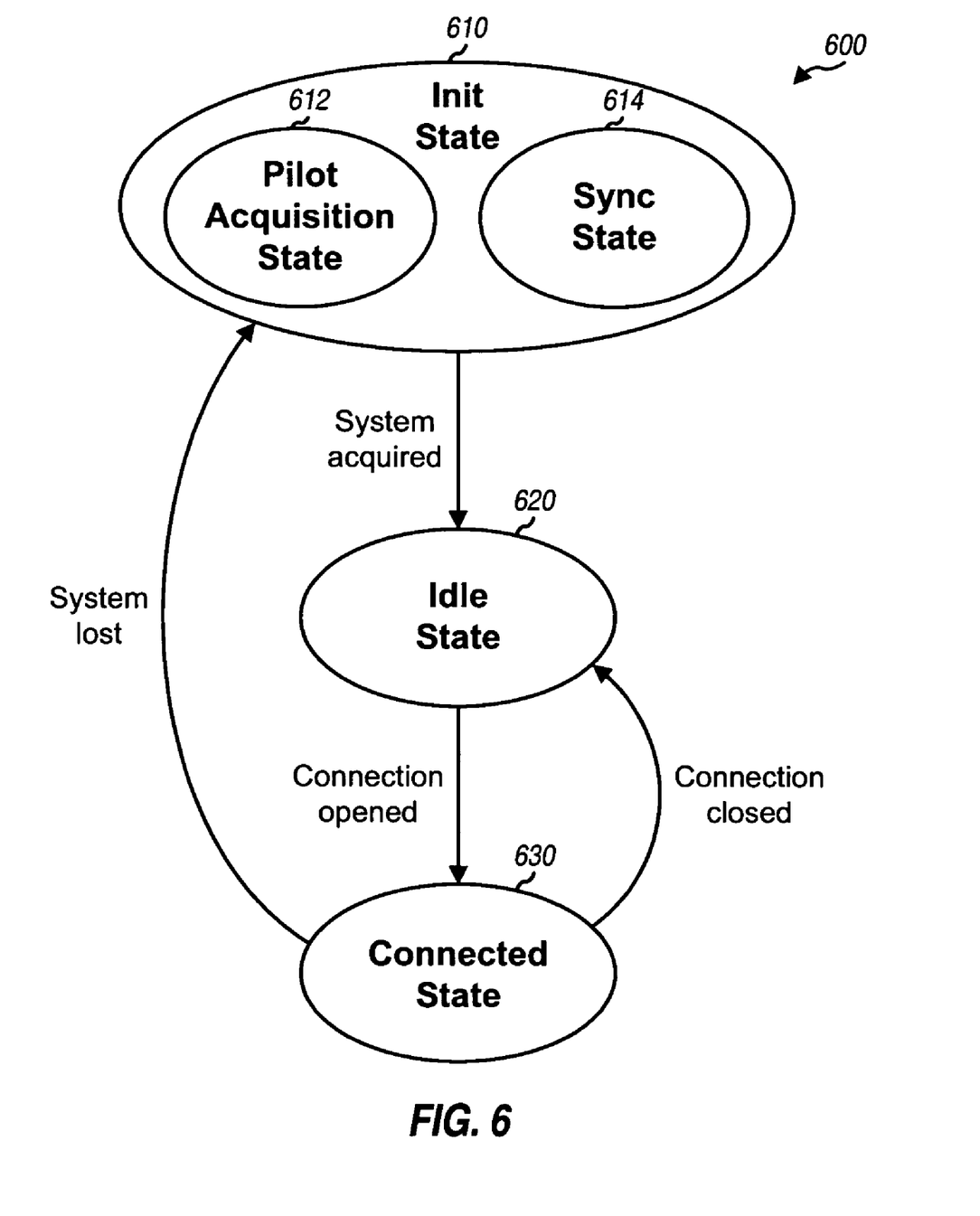
FIG. 6 shows a state diagram for the operating states of a terminal.

FIG. 6 shows an exemplary state diagram 600 of the operating states for the terminal. The terminal enters an Init state 610 upon being powered on. The Init state includes a Pilot Acquisition state 612 and a Synchronization (or Sync) state 614. In the Pilot Acquisition state, the terminal searches for and acquires pilots transmitted by base stations in the packet data system. In the Sync state, the terminal receives messages from an acquired base station and synchronizes to system time. Upon acquiring the packet data system, the terminal transitions to an Idle state 620. In the Idle state, the terminal may set up a call, open a data session, monitor for messages from the packet data system, and so on. If the system or the user initiates data exchange during the data session, then the terminal sets up a connection with the packet data system and then transitions to a Connected state 630. In the Connected state, the terminal can exchange data with the packet data system on the forward and reverse links. The terminal may transition back to the Idle state upon closing the connection or to the Init state upon losing the packet data system.

The terminal performs searches for pilots transmitted by base stations in the packet data system at a particular rate, e.g., every 20 or 30 milli seconds (ms). For each measurement period (or search interval), the terminal makes pilot strength measurements for base stations found by the searches in that measurement period. The terminal may average pilot strength measurements obtained for the current and prior measurement periods for each base station to derive a pilot strength estimate for that base station. The terminal obtains pilot strength estimates for all base stations found by the searches in each measurement period.

The terminal may periodically perform searches while operating in the Init, Idle, and Connected states to look for pilots from better base stations in the packet data system. The terminal may not have information about all base stations near its vicinity while in the Init state and hence may not have pilot strength estimates for all base stations. In the Sync state, the terminal may receive overhead messages (e.g., a Sector-Parameters message in IS-856) identifying the base stations in the coverage area. Upon receiving these overhead messages, the terminal can search for all base stations advertised by the packet data system. The terminal may start computing the composite pilot strength metric (C) upon entering the Init state with a partial list of base stations and may compute this metric with a more comprehensive list of base stations in the Idle and Connected states.

The terminal may assign demodulation elements (which are often called "fingers") to process strong multipaths for base stations in the Active Set when operating in the Sync, Idle, and Connected states. The terminal may compute received signal quality estimates for the base stations processed by the assigned fingers and may derive a DRC value for each slot. The terminal may start computing the received signal quality metric (Q) based on the DRC values, as described above, while in the Sync, Idle, and Connected states.

The terminal may operate in a slotted mode while in the Idle state. In the slotted mode, the terminal goes to sleep most of the time, powers down as much circuitry as possible to conserve battery power while asleep, and wakes up periodically (e.g., every 5.12 seconds) to check for messages from the packet data system. The awake time may be short (e.g., one frame) and may be insufficient to compute the received signal quality metric (Q). Thus, metric Q may not be reliable in the slotted mode and the maximum pilot strength metric (M) may be used instead.

While in the Connected state, the terminal may periodically "tune" to the voice/data system to make measurements for base stations in this system. The terminal may compute the VDS pilot strength metric (V) after each tune away to the voice/data system.

The terminal may thus compute different metrics at different rates and in different operating states. The terminal may compute metric Q in each slot while in the Sync, Idle, and Connected states. The terminal may compute metrics C and M in each measurement period while in the Init, Idle, and Connected states. The terminal may compute metric V for each tune away to the voice/data system while in the Connected state. In general, the metrics may be computed as needed, e.g., in the states in which the procedures using these metrics are executed.

Metrics C, Q, and M may be initialized as follows:

$$C = C_{min},$$

$$Q = Q_{init}, \text{ and}$$

$$M = M_{min}, \quad \text{Eq (7)}$$

where $Q_{init}$ is an initial value for metric Q, and $C_{min}$ and $M_{min}$ are low values for metrics C and M, respectively. For example, $Q_{init}$ may be equal to a $Q_{th}$ threshold used for metric Q. $C_{min}$ and $M_{min}$ may be the lowest possible values for metrics C and M, respectively. The terminal may initialize metrics C and M upon entering the Pilot Acquisition state or the slotted mode in the Idle state. The terminal may initialize metric Q upon entering the Pilot Acquisition state or the slotted mode and upon tuning back to the Connected state from the voice/data system. The terminal may leave metrics C, Q, and M unchanged upon transitioning from the Idle state to the Connected state.

Figure 7:
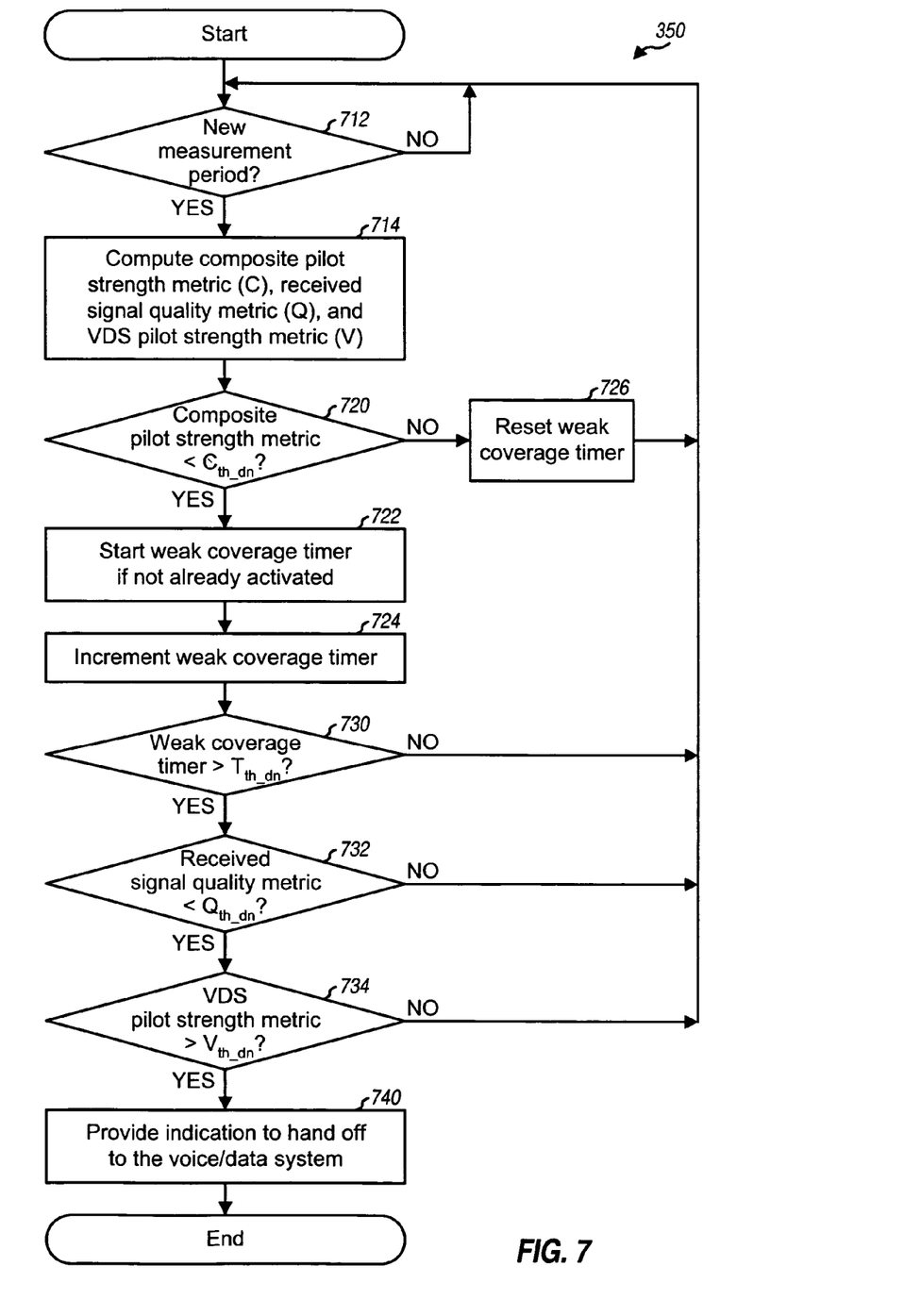
FIG. 7 shows a handdown procedure to switch to the voice/data system.

FIG. 7 shows a flow diagram of an embodiment of handdown procedure 350 in FIG. 3. Handdown procedure 350 may be executed while the terminal is in the Connected state and has an opened connection with the packet data system for an active data session. Handdown procedure 350 determines whether the coverage of the packet data system is poor and whether the data session should be handed off to the voice/data system. Handdown procedure 350 may be disabled in the Init and Idle states when the terminal does not have an active data session since (1) the terminal is not exchanging data with the packet data system and there is no immediate need to switch system and (2) the coverage of the packet data system may be good again if and when the data session becomes active at a later time. Handdown procedure may also be disabled in the Connected state if the packet data session is not open. For example, the terminal may be in the Connected state for the purpose of executing authentication procedures with the base station even though the packet data session is not open, in which case handdown functionality may not be desired.

The terminal waits in block 712 until the next measurement period arrives. The terminal then computes (1) the composite pilot strength metric (C) based on pilot strength estimates obtained in the current measurement period, (2) the received signal quality metric (Q) based on the latest received signal quality estimates, and (3) the VDS pilot strength metric (V) based on pilot strength estimates obtained for base stations in the voice/data system during the last tune away to this system (block 714). The terminal then determines whether the composite pilot strength metric is less than a $C_{th\_dn}$ threshold (block 720). If the answer is "Yes", then the terminal starts a weak coverage timer if this timer has not already been activated (block 722), increments the timer by the elapsed time since the last measurement period (block 724), and proceeds to block 730. Otherwise, if metric C is greater than or equal to the $C_{th\_dn}$ threshold, then the terminal resets the weak coverage timer (block 726) and then returns to block 712.

In block 730, the terminal determines whether the weak coverage timer has exceeded a $T_{th\_dn}$ timer threshold. If the answer is "Yes" for block 730, then the terminal determines whether the received signal quality metric is less than a $Q_{th\_dn}$ threshold (block 732). If the answer is also "Yes" for block 732, then the terminal determines whether the VDS pilot strength metric is greater than a $V_{th\_dn}$ threshold (block 734). If the answer is "Yes" for block 734, then the terminal provides an indication that the data session should be handed down to the voice/data system (block 740). Otherwise, if the answer is "No" for any of blocks 730, 732, and 734, then the terminal returns to block 712. Exemplary values for the various thresholds are shown in Table 2.

Although not shown in FIG. 7 for simplicity, the terminal may freeze the weak coverage timer during a tune away to the voice/data system to search for pilots in this system and may resume the timer upon tuning back to the packet data system. The terminal may also reinitialize the received signal quality metric (e.g., to $Q_{th\_dn}$) upon tuning back to the packet data system.

For the embodiment shown in FIG. 7, the terminal may perform handoff to the voice/data system if all of the following criteria are met: (1) weak coverage is detected for the packet data system for more than a predetermined amount of time ($T_{th\_dn}$), (2) the received signal quality metric is below the $Q_{th\_dn}$ threshold, and (3) the VDS pilot strength metric for the voice/data system is greater than the $V_{th\_dn}$ threshold. Coverage for the packet data system is deemed to be weak if the composite pilot strength metric is below the $C_{th\_dn}$ threshold. The composite pilot strength metric is used to obtain a sense of the general coverage quality of the packet data system. The received signal quality metric is used to confirm that the coverage for the terminal is poor. The VDS pilot strength metric is used to obtain a sense of the quality and availability of the voice/data system. It is desirable to switch to the voice/data system only if at least one usable pilot is received from this system. This criterion avoids a situation whereby the terminal temporarily loses coverage with the packet data system, switches to the voice/data system, and finds that signals from neither system can be received. The terminal thus switches to the voice/data system only if a strong pilot is received from the voice/data system.

Figure 8:
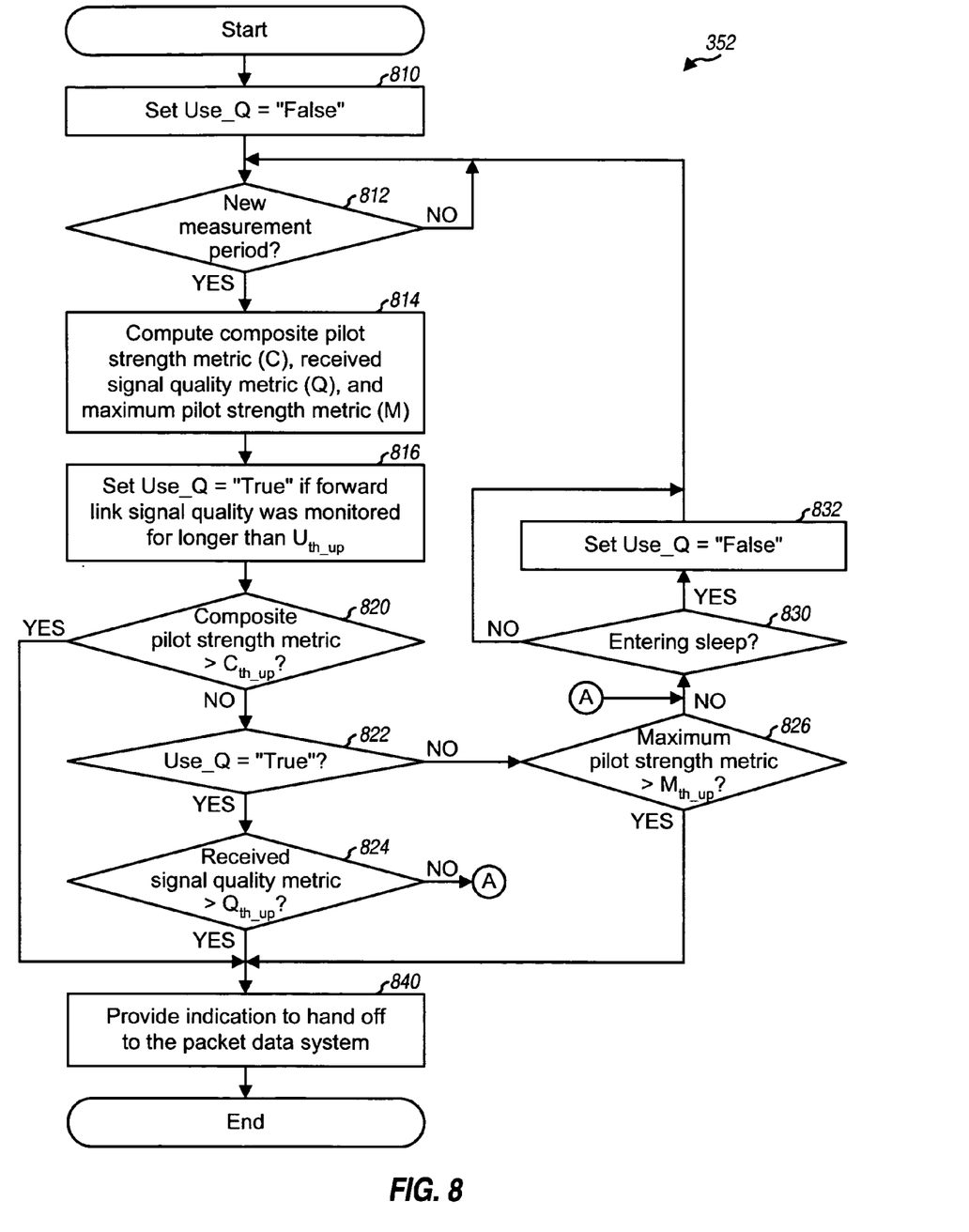
FIG. 8 shows a handup procedure to switch to the packet data system.

FIG. 8 shows a flow diagram of an embodiment of handup procedure 352 in FIG. 3. Handup procedure 352 may be executed while the terminal is in the Sync, Idle, or Connected state on the packet data system and has a dormant data session with the voice/data system. If the packet data system is lost, then the terminal periodically searches for base stations in the packet data system using a preferred roaming list (PRL). The PRL contains information to assist the terminal perform system selection and acquisition. Handup procedure 352 executes once the packet data system is acquired. Handup procedure 352 determines whether the coverage of the packet data system is good and whether the data session should be handed off to the packet data system. Handup procedure 352 may be disabled when the data session is active to simplify system operation.

The terminal initializes the metrics as shown in equation (7) and sets a Use_Q variable to "False", e.g., upon transitioning from the Pilot Acquisition state to the Sync state (block 810). The Use_Q variable indicates whether to use the received signal quality metric. The terminal waits in block 812 until the next measurement period arrives. The terminal then computes (1) the composite pilot strength metric (C) and the maximum pilot strength metric (M) based on pilot strength estimates obtained in the current measurement period and (2) the received signal quality metric (Q) based on the latest received signal quality estimates (block 814). The terminal sets the Use_Q variable to "True" if it has continuously monitored the forward link signal quality of the packet data system for a predetermined amount of time ($U_{th\_up}$) (block 816).

The terminal then determines whether the composite pilot strength metric is greater than a $C_{th\_up}$ threshold (block 820). If the answer is "Yes", then the terminal provides an indication that the data session should be handed off to the packet data system (block 840). Otherwise, if the answer is "No" for block 820, then the terminal uses either the received signal quality metric or the maximum pilot strength metric to determine whether to handup. If the Use_Q variable is "True" (as determined in block 822) and the received signal quality metric is greater than a $Q_{th\_up}$ threshold (as determined in block 824), then the terminal provides a handup indication (block 840). If the Use_Q variable is "False" (as determined in block 822) and the maximum pilot strength metric is greater than an $M_{th\_up}$ threshold (as determined in block 826), then the terminal also provides a handup indication (block 840). Exemplary values for the various thresholds are shown in Table 2.

The terminal remains on the voice/data system if the composite pilot strength metric is not strong (as determined in block 820), the received signal quality metric is not strong (as determined in block 824), and the maximum pilot strength metric is also not strong (as determined in block 826). If the answer is "No" for block 824 or 826 and if the terminal enters sleep in the Idle state (as determined in block 830), then the terminal resets the Use_Q variable to "False" (block 832). Regardless of whether the terminal enters sleep, the terminal returns to block 812.

For the embodiment shown in FIG. 8, the terminal may perform handoff to the packet data system if any one of the following criteria is met: (1) good coverage is detected for the packet data system, (2) the received signal quality metric is deemed reliable and is above the $Q_{th\_up}$ threshold, or (3) the maximum pilot strength metric is greater than the $M_{th\_up}$ threshold and metric Q is deemed unreliable. Metric Q may be deemed reliable if the terminal has continuously monitored the forward link signal quality of the packet data system for a predetermined amount of time. FIGS. 7 and 8 indicate that handup is triggered based on satisfaction of fewer criteria than handdown, which suggest that procedures 350 and 352 favor operation in the packet data system. However, different threshold values are used for the handdown and handup procedures, as shown in Table 2, to provide hysteresis and prevent ping-ponging (or continual handoffs) between the two systems.

Table 2 shows various thresholds used for handdown procedure 350 in FIG. 7 and handup procedure 352 in FIG. 8. The $P_{th\_dn}$ and $P_{th\_up}$ thresholds are used to determine whether the pilot for a given base station is sufficiently strong for use to compute the composite pilot strength metric (C). The $P_{th\_dn}$ and $P_{th\_up}$ thresholds may thus be called pilot qualification thresholds for handdown and handup, respectively. The $C_{th\_dn}$ and $C_{th\_up}$ thresholds are used to determine whether the coverage of the packet data system is good. The $Q_{th\_dn}$ and $Q_{th\_up}$ thresholds are used to determine whether the received signal quality for the packet data system is good. The $V_{th\_dn}$ threshold is used to determine whether the forward link for the voice/data system is good for handdown. The $T_{th}$ threshold is used to determine that the terminal has indeed entered weak coverage (and has not just temporarily lost coverage) for the packet data system. Table 2 also shows exemplary values for the various thresholds. Other threshold values may also be used. The threshold values may be determined by computation simulation, empirical measurement, and so on, to achieve the desired switching characteristics between the packet data system and the voice/data system (e.g., to favor one system over the other system in various operating scenarios).

TABLE 2

| Thresholds for Handdown | | Thresholds for Handup | |
|---|---|---|---|
| $P_{th\_dn}$ | −11 dB | $P_{th\_up}$ | −10 dB |
| $C_{th\_dn}$ | −7 dB | $C_{th\_up}$ | −5 dB |
| $Q_{th\_dn}$ | 50% | $Q_{th\_up}$ | 75% |
| $V_{th\_dn}$ | −14 dB | $M_{th\_up}$ | −7 dB |
| $T_{th\_dn}$ | 4 seconds | $U_{th\_up}$ | 300 ms |

FIGS. 7 and 8 show exemplary embodiments of handdown procedure 350 and handup procedure 352, respectively. These procedures may also be implemented in other manners and/or use different metrics, thresholds, criteria, timers, and so on. For example, handup procedure 352 may use a timer to ensure that the coverage of the packet data system is good for a predetermined amount of time ($T_{th\_up}$) prior to performing handup. As another example, procedures 350 and 352 may omit the composite pilot strength metric (C) and rely on the received signal quality metric (Q) and/or the maximum pilot strength metric (M) for the packet data system.

Call origination procedure 354 determines the coverage of the packet data system and provides an indication to originate a data call with a better system, which may be the packet data system or the voice/data system. The ability to detect weak coverage for the packet data system prior to call origination reduces the probability of call setup failures on the packet data system, minimizes unnecessary delays in data call origination, and reduces setup time for a PPP data session, all of which is desirable.

Call origination procedure 354 may be implemented in the same manner as handup procedure 352 and may use the same criteria and threshold values as handup procedure 352, or different criteria and/or threshold values. Call origination procedure 354 may also be implemented in other manners. For example, call origination procedure 354 may utilize metrics C, Q, and M for the packet data system and metric V for the voice/data system to determine which system is better to originate a call.

Figure 9:
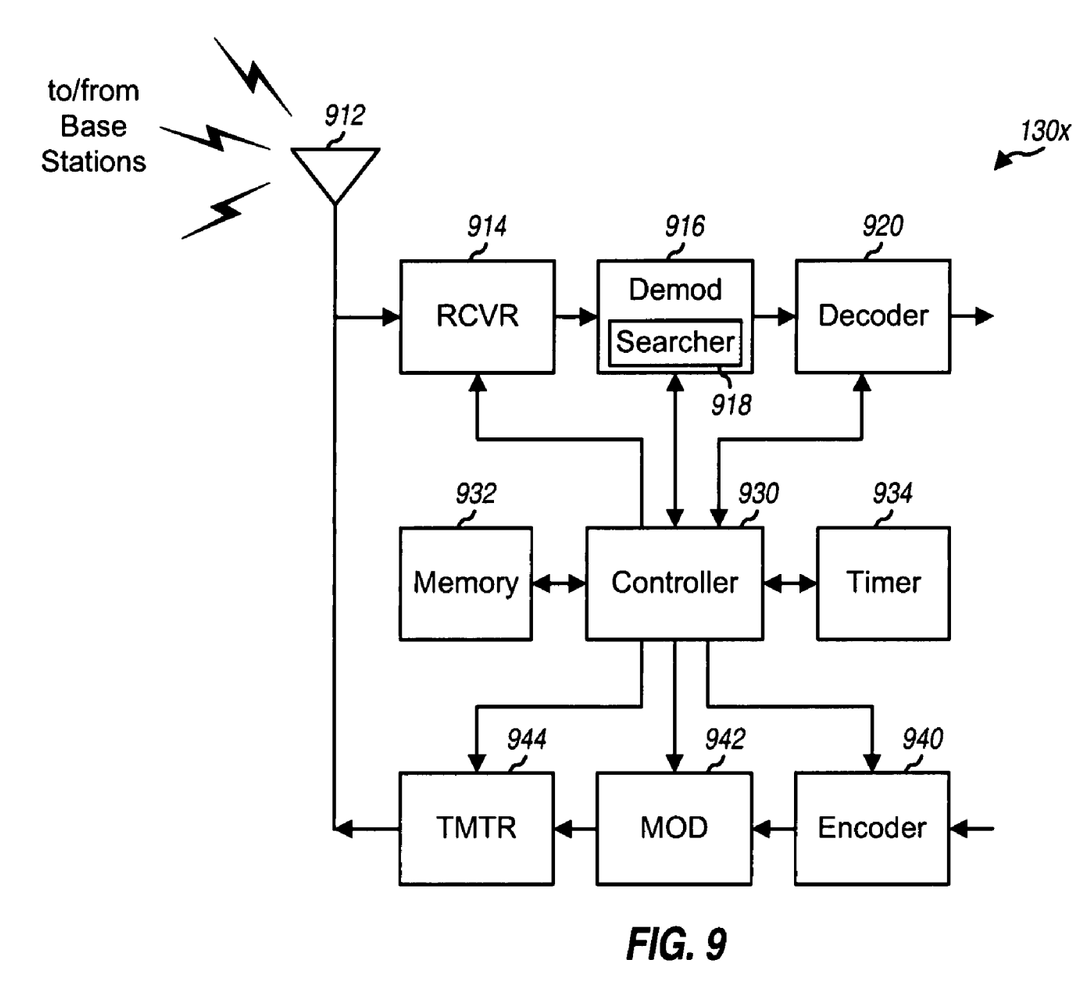
FIG. 9 shows a block diagram of the terminal.

FIG. 9 shows a block diagram of an embodiment of terminal 130x, which is one of the terminals in FIG. 1. On the forward link, an antenna 912 receives forward link signals from base stations in the packet data system and the voice/data system and provides a received signal to a receiver unit (RCVR) 914. Receiver unit 914 conditions (e.g., filters, amplifies, and frequency downconverts) the received signal, digitizes the conditioned signal, and provides data samples. A demodulator (Demod) 916 processes the data samples and provides demodulated data. A decoder 920 deinterleaves and decodes the demodulated data and provides decoded data. The processing by demodulator 916 and decoder 920 is typically different for different radio access technologies.

On the reverse link, data to be transmitted by terminal 130x is processed (e.g., encoded and interleaved) by an encoder 940 and further modulated by a modulator (MOD) 942 in accordance with the applicable radio access technology. A transmitter unit (TMTR) 944 conditions the modulated data to generate a reverse link signal, which is transmitted via antenna 912 to one or more serving base stations for terminal 130x.

A controller 930 directs operation of various processing units within terminal 130x. A memory unit 932 stores data and program codes used by controller 930 and other processing units.

For coverage determination and system switching, a searcher 918 within demodulator 916 performs searches for pilots from the voice/data system and the packet data system, as directed by controller 930, and provides measurements for pilots found by the searches. Controller 930 averages the pilot measurements to obtain pilot strength estimates and further computes received signal quality estimates for the serving base station(s) based on the pilot measurements. Controller 930 also computes the various metrics used to determine the coverage of the packet data system. Controller 930 further implements handdown procedure 350, handup procedure 352, and call origination procedure 354. A timer 934 maintains various timers used for the handdown, handup, and call origination procedures such as the weak coverage timer, the forward link monitor timer, and so on. Timer 934 also indicates when searches are to be performed.

The coverage determination and system switching techniques described herein may be implemented by various means. For example, these techniques may be implemented in hardware, software, or a combination thereof. For a hardware implementation, the processing units that compute metrics, determine coverage, and decide switching between systems may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

For a software implementation, the techniques described herein may be implemented with modules (e.g., procedures, functions, and so on) that perform the functions described herein. The software codes may be stored in a memory unit (e.g., memory unit 932 in FIG. 9) and executed by a processor (e.g., controller 930). The memory unit may be implemented within the processor or external to the processor, in which case it can be communicatively coupled to the processor via various means as is known in the art.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of determining coverage of a wireless communication system, comprising:
    obtaining at least one received signal quality estimate for at least one base station selected for data transmission;
    deriving a first metric based on the at least one received signal quality estimate for the at least one base station;
    obtaining a plurality of pilot strength estimates for a plurality of base stations in the system;
    deriving a second metric based on the plurality of pilot strength estimates for the plurality of base stations; and
    determining whether to switch from the at least one base station to a second base station based on the first metric and the second metric,
    wherein the deriving the first metric comprises:
    determining a rate for data transmission for each time interval based on the at least one received signal quality estimate obtained for the at least one base station for the time interval;
    ascertaining an average percentage of time non-null rates are determined, and
    computing the first metric based on the average percentage of time for non-null rates.

2. The method of claim 1, further comprising:
    deriving a third metric based on the plurality of pilot strength estimates for the plurality of base stations, wherein the second metric is a sum of the plurality of pilot strength estimates and the third metric is a maximum of the plurality of pilot strength estimates, and wherein the coverage of the system is determined further based on the third metric.

3. The method of claim 1, wherein the first metric is computed based on the received signal quality estimate for a single base station selected for data transmission.

4. The method of claim 1, wherein each of the at least one received signal quality estimate is indicative of a signal-to-noise-and-interference ratio achieved for one of the at least one base station.

5. A method of determining coverage of a wireless communication system, comprising:
    obtaining at least one received signal quality estimate for at least one base station selected for data transmission,
    deriving a first metric based on the at least one received signal quality estimate for the at least one base station, and
    determining whether the coverage of the system is good based on the first metric,
    wherein the deriving the first metric comprises:
    determining a rate for data transmission for each time interval based on the at least one received signal quality estimate obtained for the at least one base station for the time interval,
    ascertaining an average percentage of time non-null rates are determined, and
    computing the first metric based on the average percentage of time for non-null rates.

6. The method of claim 5, wherein the ascertaining the average percentage of time for non-null rates comprises
    for each of a plurality of time intervals, setting a filter input for the time interval to a first value if the rate obtained for the time interval is a null rate and to a second value if the rate is a non-null rate, and
    filtering filter inputs for the plurality of time intervals to obtain the average percentage of time for non-null rates.

7. An apparatus in a wireless communication system, comprising:
    a demodulator operative to obtain at least one received signal quality estimate for at least one base station selected for data transmission and to obtain a plurality of pilot strength estimates for a plurality of base stations in the system; and
    a controller operative to derive a first metric based on the at least one received signal quality estimate for the at least one base station, to derive a second metric based on the plurality of pilot strength estimates and to determine the coverage of the system further based on the second metric, and to determine whether to switch from the at least one base station to a second base station based on the first metric and the second metric,
    wherein in deriving the first metric the controller is further operative to determine a rate for data transmission for each time interval based on the at least one received signal quality estimate obtained for the at least one base station for the time interval, ascertain an average percentage of time non-null rates are determined, and compute the first metric based on the average percentage of time for non-null rates.

8. The apparatus of claim 7, wherein the wireless communication system is a packet data system capable of providing packet data service.

9. An apparatus in a wireless communication system, comprising:
    means for obtaining at least one received signal quality estimate for at least one base station selected for data transmission;
    means for deriving a first metric based on the at least one received signal quality estimate for the at least one base station;
    means for obtaining a plurality of pilot strength estimates for a plurality of base stations in the system;

means for deriving a second metric based on the plurality of pilot strength estimates for the plurality of base stations; and means for determining whether to switch from the at least one base station to a second base station based on the first metric and the second metric, wherein the means for deriving the first metric further comprises:

means for determining a rate for data transmission for each time interval based on the at least one received signal quality estimate obtained for the at least one base station for the time interval means for ascertaining an average percentage of time non-null rates are determined, and means for computing the first metric based on the average percentage of time for non-null rates.

10. A processor readable media for storing instructions operable in a terminal to:

obtain at least one received signal quality estimate for at least one base station in a wireless communication system and selected for data transmission to the terminal;

derive a first metric based on the at least one received signal quality estimate for the at least one base station;

obtain a plurality of pilot strength estimates for a plurality of base stations in the first system;

derive a second metric based on the plurality of pilot strength estimates for the plurality of base stations in the first system; and determine whether to switch from the at least one base station to a second base station based on the first metric and the second metric, wherein to derive the first metric comprises instructions operable in a terminal to:

determine a rate for data transmission for each time interval based on the at least one received signal quality estimate obtained for the at least one base station for the time interval;

ascertain an average percentage of time non-null rates are determined, and compute the first metric based on the average percentage of time for non-null rates.

11. A method of switching a terminal between first and second wireless communication systems, comprising:

obtaining at least one received signal quality estimate for at least one base station in the first system;

deriving a first metric based on the at least one received signal quality estimate for the at least one base station in the first system;

obtaining a plurality of pilot strength estimates for a plurality of base stations in the first system;

deriving a second metric based on the plurality of pilot strength estimates for the plurality of base stations in the first system; and determining whether to switch from the first system to the second system, or from the second system to the first system, based on the first metric and the second metric, wherein to derive the first metric comprises:

determining a rate for data transmission for each time interval based on the at least one received signal quality estimate obtained for the at least one base station for the time interval;

ascertaining an average percentage of time non-null rates are determined, and computing the first metric based on the average percentage of time for non-null rates.

12. The method of claim 11, further comprising:

determining reliability of the first metric, and wherein the switch from the second system to the first system is determined based on the first metric if deemed reliable.

13. A method of switching a terminal between first and second wireless communication systems, comprising:

obtaining at least one received signal quality estimate for at least one base station in the first system;

deriving a first metric based on the at least one received signal quality estimate for the at least one base station in the first system;

determining whether to switch from the first system to the second system, or from the second system to the first system, based on the first metric;

obtaining a plurality of pilot strength estimates for a plurality of base stations in the first system;

deriving a second metric based on the plurality of pilot strength estimates for the plurality of base stations in the first system, and wherein the switch from the first system to the second system, or from the second system to the first system, is determined further based on the second metric;

obtaining at least one pilot strength estimate for at least one base station in the second system; and deriving a third metric based on the at least one pilot strength estimate for the at least one base station in the second system, and wherein the switch from the first system to the second system is determined further based on the third metric.

14. A method of switching a terminal between first and second wireless communication systems, comprising:

obtaining at least one received signal quality estimate for at least one base station in the first system;

deriving a first metric based on the at least one received signal quality estimate for the at least one base station in the first system;

determining whether to switch from the first system to the second system, or from the second system to the first system, based on the first metric;

obtaining a plurality of pilot strength estimates for a plurality of base stations in the first system;

deriving a second metric based on the plurality of pilot strength estimates for the plurality of base stations in the first system, and wherein the switch from the first system to the second system, or from the second system to the first system, is determined further based on the second metric; and determining an amount of time the second metric is below a threshold value, and wherein the switch from the first system to the second system is determined further based on the amount of time the second metric is below the threshold value.

15. A method of switching a terminal between first and second wireless communication systems, comprising:

obtaining at least one received signal quality estimate for at least one base station in the first system;

deriving a first metric based on the at least one received signal quality estimate for the at least one base station in the first system;

determining whether to switch from the first system to the second system, or from the second system to the first system, based on the first metric;

obtaining a plurality of pilot strength estimates for a plurality of base stations in the first system;

deriving a second metric based on the plurality of pilot strength estimates for the plurality of base stations in the first system, and wherein the switch from the first system to the second system, or from the second system to the first system, is determined further based on the second metric; and deriving a third metric based on a maximum of the plurality of pilot strength estimates for the plurality of base stations in the first system, and wherein the switch from the second system to the first system is determined further based on the third metric.

16. A method of switching a terminal between first and second wireless communication systems, comprising:
- obtaining at least one received signal quality estimate for at least one base station in the first system;
- deriving a first metric based on the at least one received signal quality estimate for the at least one base station in the first system;
- determining whether to switch from the first system to the second system, or from the second system to the first system, based on the first metric;
- determining reliability of the first metric, and wherein the switch from the second system to the first system is determined based on the first metric if deemed reliable; and
- determining an amount of time the at least one base station in the first system was monitored, and wherein the reliability of the first metric is determined based on the amount of time the at least one base station in the first system was monitored.

17. An apparatus comprising:
- a demodulator operative to obtain at least one received signal quality estimate for at least one base station in a first wireless communication system and to obtain a plurality of pilot strength estimates for a plurality of base stations in the first system; and
- a controller operative to derive a first metric based on the at least one received signal quality estimate for the at least one base station in the first system and to derive a second metric, based on the plurality of pilot strength estimates for the plurality of base stations in the first system and to determine whether to switch from the first system to a second wireless communication system, or from the second system to the first system, based on the first metric and the second metrics,
- wherein the demodulator is further operative to determine a rate for data transmission for each time interval based on the at least one received signal quality estimate obtained for the at least one base station for the time interval, ascertain an average percentage of time non-null rates are determined, and compute the first metric based on the average percentage of time for non-null rates.

18. The apparatus of claim 17, wherein the first system is configured to provide packet data service, and wherein the second system is configured to provide voice and packet data services.

19. An apparatus comprising:
- a demodulator operative to obtain at least one received signal quality estimate for at least one base station in a first wireless communication system; and
- a controller operative to derive a first metric based on the at least one received signal quality estimate for the at least one base station in the first system and to determine whether to switch from the first system to a second wireless communication system, or from the second system to the first system, based on the first metric,
- wherein the demodulator is further operative to obtain a plurality of pilot strength estimates for a plurality of base stations in the first system, and wherein the controller is further operative to derive a second metric based on the plurality of pilot strength estimates for the plurality of base stations in the first system and to determine whether to switch from the first system to the second system, or from the second system to the first system, further based on the second metric, and
- wherein the demodulator is further operative to obtain at least one pilot strength estimate for at least one base station in the second system, and wherein the controller is further operative to derive a third metric based on the at least one pilot strength estimate for the at least one base station in the second system and to determine whether to switch from the first system to the second system further based on the third metric.

20. An apparatus comprising:
- a demodulator operative to obtain at least one received signal quality estimate for at least one base station in a first wireless communication system; and
- a controller operative to derive a first metric based on the at least one received signal quality estimate for the at least one base station in the first system and to determine whether to switch from the first system to a second wireless communication system, or from the second system to the first system, based on the first metric,
- wherein the demodulator is further operative to obtain a plurality of pilot strength estimates for a plurality of base stations in the first system, and wherein the controller is further operative to derive a second metric based on the plurality of pilot strength estimates for the plurality of base stations in the first system and to determine whether to switch from the first system to the second system, or from the second system to the first system, further based on the second metric, and
- wherein the controller is further operative to derive a third metric based on a maximum of the plurality of pilot strength estimates for the plurality of base stations in the first system and to determine whether to switch from the second system to the first system further based on the third metric.

21. An apparatus comprising:
- means for obtaining at least one received signal quality estimate for at least one base station in a first wireless communication system;
- means for deriving a first metric based on the at least one received signal quality estimate for the at least one base station in the first system;
- means for obtaining a plurality of pilot strength estimates for a plurality of base stations in the first system;
- means for deriving a second metric based on the plurality of pilot strength estimates for the plurality of base stations in the first system; and
- means for determining whether to switch from the first system to a second wireless communication system, or from the second system to the first system, based on the first metric and the second metric,
- wherein deriving the first metric comprises:
  - means for determining a rate for data transmission for each time interval based on the at least one received signal quality estimate obtained for the at least one base station for the time interval;
  - means for ascertaining an average percentage of time non-null rates are determined; and
  - means for computing the first metric based on the average percentage of time for non-null rates.

22. An apparatus comprising:
means for obtaining at least one received signal quality estimate for at least one base station in a first wireless communication system;
means for deriving a first metric based on the at least one received signal quality estimate for the at least one base station in the first system;
means for determining whether to switch from the first system to a second wireless communication system, or from the second system to the first system, based on the first metric;
means for obtaining a plurality of pilot strength estimates for a plurality of base stations in the first system;
means for deriving a second metric based on the plurality of pilot strength estimates for the plurality of base stations in the first system, and wherein the switch from the first system to the second system, or from the second system to the first system, is determined further based on the second metric;
means for obtaining at least one pilot strength estimate for at least one base station in the second system; and
means for deriving a third metric based on the at least one pilot strength estimate for the at least one base station in the second system, and wherein the switch from the first system to the second system is determined further based on the third metric.

23. An apparatus comprising:
means for obtaining at least one received signal quality estimate for at least one base station in a first wireless communication system;
means for deriving a first metric based on the at least one received signal quality estimate for the at least one base station in the first system;
means for determining whether to switch from the first system to a second wireless communication system, or from the second system to the first system, based on the first metric;
means for obtaining a plurality of pilot strength estimates for a plurality of base stations in the first system;
means for deriving a second metric based on the plurality of pilot strength estimates for the plurality of base stations in the first system, and wherein the switch from the first system to the second system, or from the second system to the first system, is determined further based on the second metric; and
means for deriving a third metric based on a maximum of the plurality of pilot strength estimates for the plurality of base stations in the first system, and wherein the switch from the second system to the first system is determined further based on the third metric.

* * * * *